July 7, 1970        S. M. EWING        3,519,726

TRANSFORMER VAULT FOR UNDERGROUND INSTALLATION

Filed Nov. 6, 1968

INVENTOR.
SAM M. EWING

BY

*W. B. Harpman*

ATTORNEY

United States Patent Office 3,519,726
Patented July 7, 1970

---

3,519,726
TRANSFORMER VAULT FOR UNDERGROUND INSTALLATION
Sam M. Ewing, Youngstown, Ohio, assignor to Youngstown Steel & Alloy Company, Canfield, Ohio, a corporation of Ohio
Filed Nov. 6, 1968, Ser. No. 773,853
Int. Cl. H02g 9/10
U.S. Cl. 174—37                                       1 Claim

ABSTRACT OF THE DISCLOSURE

An underground transformer vault for electrical transformers formed of a pair of 180 degree arcuate members having out-turned registering flanges forming a cylindrical vault open at its upper and lower ends and apertured inwardly from its ends to permit the passage therethrough of electrical cables and provided with sealing means about said apertures.

BACKGROUND OF THE INVENTION

Field of the invention

This invention relates to transformer vaults for underground installation for the reception and protection of electrical transformers in underground distribution systems.

Description of the prior art

Prior structures of this type have comprised box-like structures farmed of various materials in which the electrical transformers were installed with considerable difficulty. This invention eliminates problems in that the transformer can be installed, the vault assembled thereabout, the cables pulled through the openings in the vault and attached to the transformer quickly and easily.

SUMMARY OF THE INVENTION

A transformer vault for the underground protection of an electrical transformer consisting of a pair of 180 degree members flanged along their edges for attachment to one another to form a cylindrical enclosure and provided with apertures through which electrical cables may be pulled and attached to transformers in the vault thus formed.

DESCRIPTION OF THE PREFERRED EMBODIMENT

In its simplest form, the transformer vault of this invention is comprised of a pair of oppositely disposed 180 degree arcuate sections of corrugated steel preferably zinc coated so as to be corrosion resistant.

Figure 1:
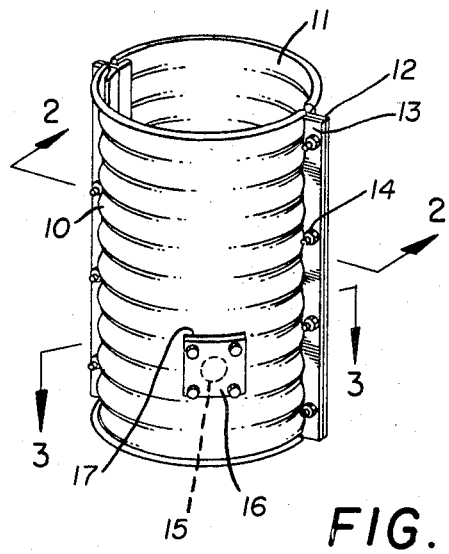
FIG. 1 is a perspective view of the transformer vault.

In FIG. 1 of the drawings, the sections are indicated by the numerals 10 and 11 and each is provided at its straight ends with L shaped angles 12 and 13 each of which has one of its longitudinal sections tack welded to a longitudinal inner surface of the arcuate sections 10 and 11 with its other longitudinal portion extending outwardly so that the angles 12 and 13 are positioned in abutting relation. Openings formed in registry in these longitudinal portions of the angles 12 and 13 permit nut and bolt assemblies 14 to be positioned therethrough so that the arcuate sections 10 and 11 are secured to one another to form a cylindrical vault open at its upper and lower ends.

Figures 2, 3:
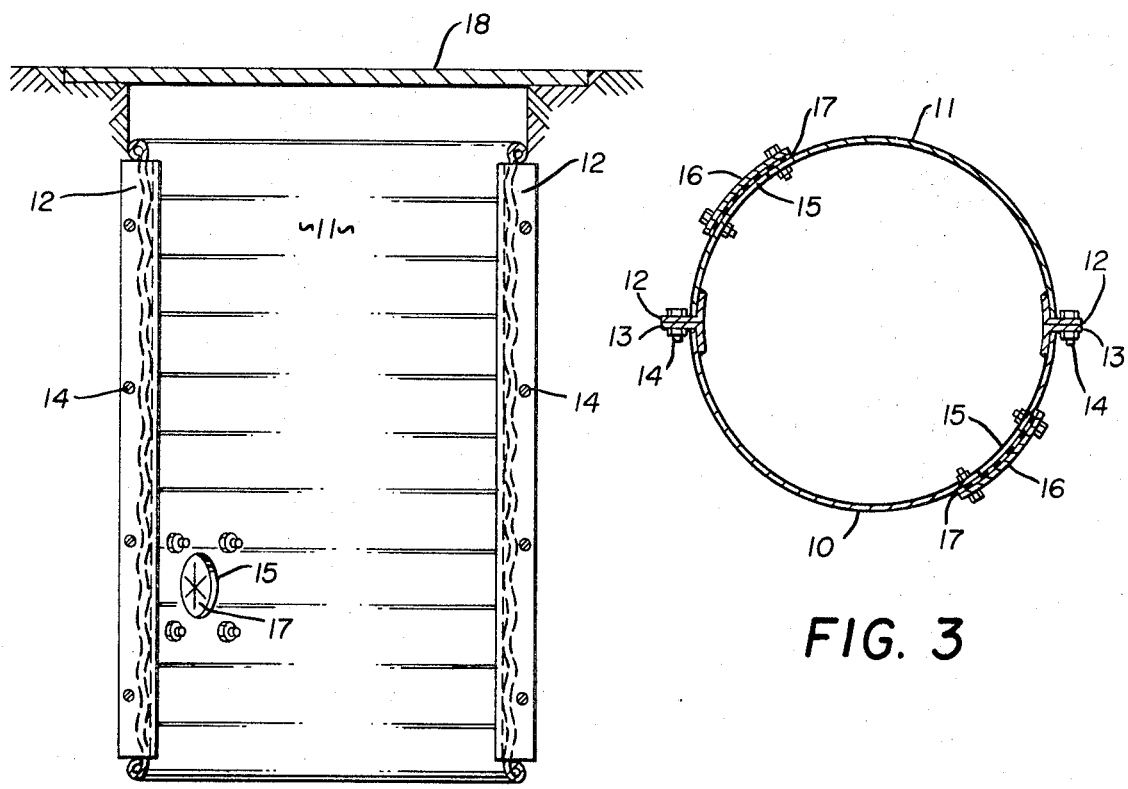
FIG. 2 is an enlarged cross sectional elevation taken on line 2—2 of FIG. 1.
FIG. 3 is a horizontal section on line 3—3 of FIG. 1.

In FIGS. 2 and 3 of the drawings, the angles 12 and 13 are shown individually and in joined relation with the nut and bolt assemblies 14 extending through the registering opening.

Referring again to FIG. 1 of the drawings, it will be seen that there is an access opening 15 in the arcuate section 10 of the transformer vault, the same is covered with a corrugated metal patch plate 16 and a rubber sealing gasket 17 which is positioned between the patch plate 16 and the outer surface of the arcuate section 10. A similar opening 15 is formed in the other arcuate section 11 as seen in FIGS. 2 and 3 of the drawings. These openings provide ready access for electrical cables which can be easily threaded therethrough.

In FIG. 2 of the drawings, the transformer vault will be seen to be installed in an underground location with a covering grill or other accessory 18 installed thereover. If desired, a bottom can be installed and still other options dependent upon the particular transformer installed in the vault include transversely extending rods in the vault for supporting the transformer above the bottom of the vault proper.

These various adaptations and uses will occur to those skilled in transformer vault installations and render the present invention adaptable to various installations in various locations.

It will occur to those skilled in the art that when the height of the standard vault sections is insufficient for the particular location desired, lengthening extensions comprising short sections of identical configuration with the arcuate sections 10 and 11 are simply added to the upper or lower end, thereby increasing the height in the desired amount. A typical transformer vault is three feet in diameter and five feet deep and it will be seen that it will accept a variety of covers, grating or manhole type as hereinbefore referred to. It will also be seen that the installation of a transformer in the vault shown and described herein is simplified in that the transformer can be placed in an excavation, the vault positioned therearound in sections and assembled and the cables pulled through the openings in the vault and attached to the transformer all without moving or altering the position of the transformer which considerably expedites the installation of the transformer station.

The flat gasket 17 under each of the patch plates 16 is so formed that when a cable is pulled through the opening 15 the material of the gasket moves therewith and thus protects the cable from the edges of the opening 15.

As seen in FIGS. 1 and 2, the upper and lower ends of the transformer vault are rolled or turned outwardly to reinforce the vault.

The above described structure provides relatively easy and fast installation of underground transformer vaults about electrical transformers. The structure is versatile so that it can be used with different grade lines and be installed at different depths and with various covers for venting or protection purposes.

Although but one embodiment of the present invention has been illustrated and described, it will be apparent to those skilled in the art that various changes and modifications may be made therein.

What is claimed is:
1. An underground vault for transformers and the like comprising an open-ended cylindrical vault body consisting of a pair of confronting semi-cylindrical vault halves, each vault half having one flange of an angle iron tack welded to each of its longitudinal inner marginal edge surfaces with the other flange of the angle iron extending radially outwardly beyond each said edge and forming a bolting flange, the adjacent bolting flanges of confronting angle irons being substantially identical in shape and size and having a plurality of registering holes throughout substantially the length thereof, bolts received through said holes holding said bolt receiving flanges in contiguous relationship throughout substantially the entire length thereof, said angle irons being commensurate in length with said vault body, an access opening in the side of each vault half, a slitted resilient gasket sealingly covering each said access opening on the outside thereof and having its marginal edge portion overlying the associated vault half surrounding the opening, an imperforate rigid access plate fastened over each said gasket and access opening and clamping the gasket between the plate and vault half by means of bolts passed through the marginal edge portions of said plate and said gasket and the vault half, the opposite end edges of said vault body rolled or turned outwardly to reinforce the same, said vault body and said access plate formed of galvanized corrugated sheet metal.

References Cited

UNITED STATES PATENTS

| | | | |
|---|---|---|---|
| 58,648 | 10/1866 | Joy. | |
| 1,076,595 | 10/1913 | McMartin | 138—159 |
| 1,265,767 | 5/1918 | Fouts. | |
| 1,585,265 | 5/1926 | Schlafly | 138—159 |
| 2,803,370 | 8/1957 | Lennard | 220—24 |
| 3,086,674 | 4/1963 | Scheuerman | 220—24 |
| 3,390,225 | 6/1968 | Couch et al. | 174—37 |

FOREIGN PATENTS

| | | |
|---|---|---|
| 151,849 | 12/1937 | Austria. |
| 1,335,646 | 7/1962 | France. |
| 1,081,209 | 8/1967 | Great Britain. |

LARAMIE E. ASKIN, Primary Examiner

U.S. Cl. X.R.

138—159; 174—65; 220—5